Oct. 1, 1929.    H. B. RUDD    1,730,016
APPARATUS FOR STERILIZING LIQUIDS
Filed March 3, 1920    4 Sheets-Sheet 2

Patented Oct. 1, 1929

1,730,016

UNITED STATES PATENT OFFICE

HARRY B. RUDD, OF MANSFIELD, OHIO, ASSIGNOR TO ELECTROPURE CORPORATION, OF DETROIT, MICHIGAN, A CORPORATION OF DELAWARE

APPARATUS FOR STERILIZING LIQUIDS

Application filed March 3, 1920. Serial No. 362,928.

My invention has for its object the production of apparatus for electrically treating liquids, and is especially adapted for use in connection with the sterilization of milk, or any other liquid, containing undesirable bacteria.

A further object of my invention is to provide an improved apparatus of the kind described, wherein the liquid to be treated is caused to pass between electrodes spaced apart a predetermined distance whereby it is possible to regulate with extreme accuracy the amount of current passing through the liquid, thereby preventing burning or scorching it, which has heretofore been a serious objection of the use of apparatus of this kind.

It is also an object of my invention to so distribute the liquid being treated over a predetermined surface area that it is not possible for any of the fluid to pass untreated and thereby carry sufficient bacteria into the treated liquid with the result that said treatment is rendered ineffective.

A further object of the invention is to provide an apparatus which is practically automatic in its operation, and is so constructed that the liquid being treated is not subjected to contamination by exposure to atmospheric or other conditions by reason of which it has heretofore been found that liquids once sterilized would again develop undesirable bacteria within a short period of time.

In the use of my present invention the liquid being treated is passed directly from the sterilizing apparatus to the container wherein it is sealed without exposure to recontaminating influences.

A further object of my invention is to provide a means for pre-heating the liquid to be introduced into the apparatus for treatment, by utilizing the heat units contained in the treated liquid passing from the machine and to warm the fresh or untreated liquid, and at the same time to utilize the cold liquid to cool the treated liquid in its passage from the sterilizer.

A further object of my invention is to provide an apparatus of this kind which will comprise few parts, all of which may be readily assembled for use, and readily separated for cleansing purposes in order to preserve a sanitary condition at all times without losing time in so doing, and to provide apparatus for carrying out the process for treating liquids described in my co-pending application, Serial No. 362,927.

These and other objects of my invention will be apparent to those skilled in the art to which this invention belongs. In the accompanying drawings I have illustrated what I now consider the preferred forms of an embodiment of the necessary elements in my construction and in these drawings:—

Figure 1:
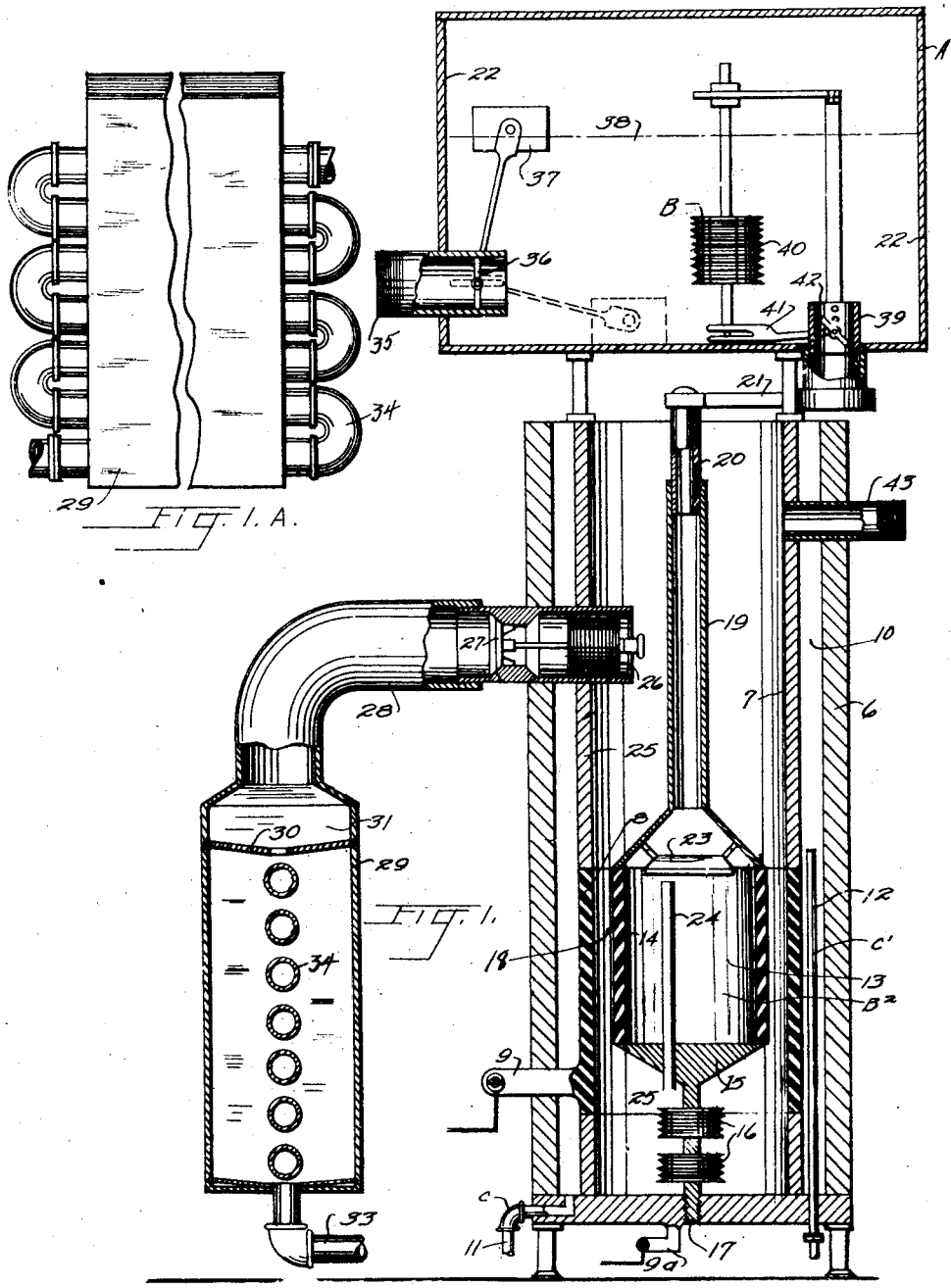
Fig. 1 is a vertical, sectional view of the complete apparatus illustrating a preheater, an automatically operated feeding receptacle, and a sterilizer, Fig. 1ª is a detail of the preheater.

In describing my invention I will first refer to the construction shown in Figure 1, in which 6 represents preferably an upright casing or jacket containing the sterilizing apparatus. This casing may be round or angular in cross section and of any height desired, depending upon the quantity of liquid to be treated.

7 is a tubular lining, having formed in the lower part thereof an electrode 8, which has connection with one of the terminals 9 and which extends to a suitable source of electrical energy, the other terminal 9ª having connection with a co-acting electrode to be presently described, and having also suitable connections with a source of electrical energy.

10 is a chamber formed between the tubular lining 7 and the outer wall 6. This chamber 10 forms a water jacket by means of which the electrode 8 may be cooled by introducing cold water through the pipe 11 which will keep said chamber filled to a point above electrode 8.

12 is a discharge pipe by means of which the water will be maintained at the desired level in the chamber 10, by overflowing through said pipe 12 when reaching a point above the electrode 8.

Suitably mounted within the tubular lining 7 is a receptacle 13, the sides 14 and bottom 15 of which form an electrode mounted upon a thermostat 16, and supported, preferably by a screw threaded connection 17, in the bottom of the casing 6. The diameter of the receptacle 13 is sufficiently smaller than the diameter of the lining 7 to provide a narrow passageway, 18, between the electrodes 8 and 14 as shown in the drawing.

The top of the receptacle 13 narrows to an upwardly extending neck 19, which receives in the end thereof the feeding tube or pipe 20, which through the pipe 21 has connection with the receptacle 22, which is supported above the casing 6.

Arranged in the upper part of the receptacle 13 is a deflector, 23, by means of which the flowing liquid is spread toward the walls of the inner electrode 14 until said receptacle 13 is practically filled. The pipe 24 extends vertically within the receptacle 13 and through the bottom thereof. When the liquid to be treated has filled the receptacle to the top of the pipe 24, it overflows through said pipe to the bottom of the chamber 25. As the liquid continues to discharge through the pipe 24, it rises to a higher level in the chamber 25 through the passageway 18 between the electrodes 8 and 14, where electric current (preferably alternating type) passes through the liquid between the electrodes and, depending upon the electrical conductivity of the liquid being treated, the said liquid becomes heated more or less rapidly and as the discharge of liquid from the chamber is controlled by a thermo-dynamic valve the volume of flow per unit of time will be such that the liquid is raised to the temperature determined by the valve before it may pass from the receptacle. To destroy the major portion of the bacteria in milk the temperature should be approximately 155 to 160 degrees F., and it is to be understood it is the temperature attained by the liquid that causes destruction of the bacteria, and that the apparatus in this particular respect so far as I am able to determine, functions approximately as previous well known types of pasteurizing apparatus in which the liquid is heated in the usual well known way.

It will be observed that the action of the currents of electricity passing through the liquid is effective while it is passing upwardly through the passageway formed between the two electrodes.

The thermostat 16 is of the type rendered operative by the temperature surrounding it, and when a certain temperature is attained, it will automatically expand and cause the receptacle 13 to rise upwardly, by which action the upper part of the electrode surface 14 will be carried above the electrode surface 8, thereby rendering a portion of the electrode 14 inoperative and lessening the amount of the current passing through the liquid being treated.

During this operation the chamber 25 is gradually being filled with the liquid which has been treated, until it reaches the discharge valve 27 which is positioned above the receptacle 13.

This discharge valve 27 is of thermodynamic construction and is automatically operated by the heated liquid passing upwardly in the chamber 25, when it contacts with the member 26, and by the expansion thereof, due to the temperature of the liquid, it unseats or opens the valve 27 and allows the treated liquid to pass through the discharge pipe 28, into a cooler 29.

The cooler 29 comprises a receptacle having near the top thereof, a perforated diaphragm 30, above which is a chamber 31, into which the liquid from the sterilizer is discharged through the pipe 28. The bottom 32 of this receptacle is preferably inclined toward the center from whence a discharge pipe 33 extends to a suitable bottling sealing mechanism.

A pipe 34 which conveys fresh liquid to the sterilizer is arranged in a coil or in a corrugation within said receptacle 29, beneath the opening in the diaphragm 30 to permit the passage of the treated liquid being discharged therein through the perforated diaphragm 30, to flow over said pipe and preheat the fresh liquid passing therethrough as the treated liquid is in transit to be discharged through pipe 33.

Fresh or untreated liquid is at the same time passing through said pipe 34 while the treated liquid is passing over and around said pipe on its way to the exit 33. The effect of this arrangement is to enable me to utilize the heat contained in the treated liquid to raise the temperature of the untreated liquid, and to utilize the fresh or untreated liquid to cool the treated liquid, thereby raising the temperature or preheating the fresh untreated liquid to approximately 100 degrees Fahr. more or less, before it is introduced into the sterilizer.

The untreated liquid passes through the pipe 34 in the receptacle 29 and is discharged through the pipe 35 into the receptacle 22 which is located above the sterilizing apparatus.

The source of supply of the untreated liquid is preferably maintained at a lower level than the receptacle 22 which receptacle is at a higher level than the treating chamber, thereby causing said liquid to travel by siphonic action into the treating chamber. A butterfly valve, 36, of well known construction is located in the exit end of the pipe 35. 37, is a float connected therewith and which is adapted to close the valve when the liquid has filled the receptacle 23 to a line, 38, which may be arranged higher or lower than shown in the drawing as desired.

A discharge pipe 39 is located in the bottom of receptacle 22, the discharge of the liquid therethrough being regulated by a thermodynamic valve, having the expansive member 40 connected by means of the link, 41, with the valve 42, to regulate the flow of liquid from said receptacle through the pipes 21 into the neck or tube 19 of the sterilizing apparatus heretofore explained.

In the sterilizing process, if at any time the temperature of the liquid passing between the electrodes 8 and 14 has not been raised to a point sufficiently high to automatically cause the operation of valve 27 to discharge the same, the liquid being treated will continue to rise in chamber 25 until it reaches the level of discharge pipe 43, where it will overflow and be carried to the receptacle containing the untreated liquid, and be again passed through the sterilizer for treatment.

Figure 2:
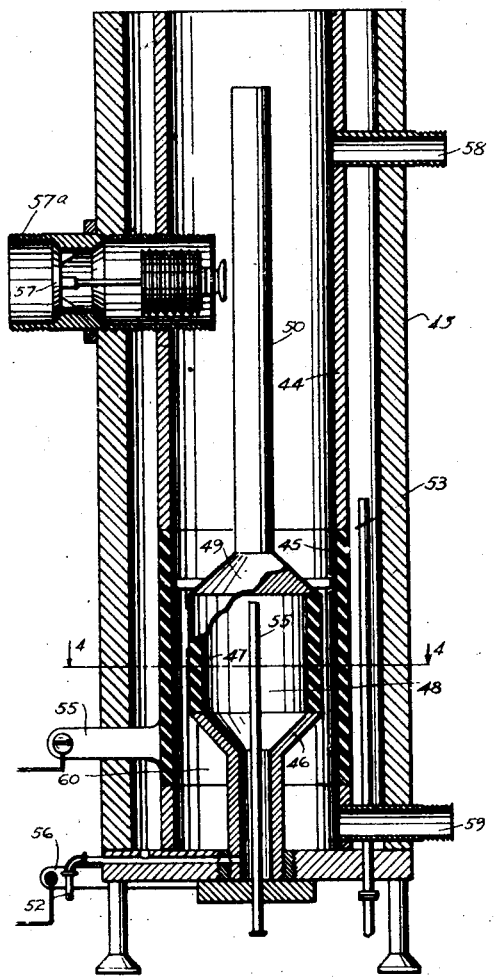
Fig. 2 is a vertical, sectional view of a modified form of sterilizing apparatus.
Figure 3:
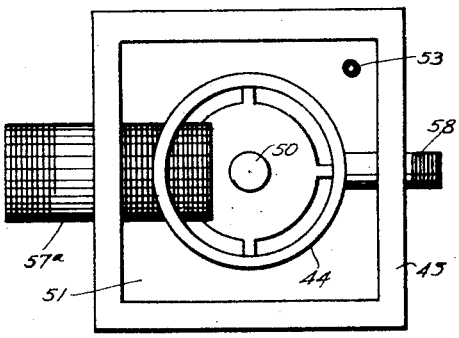
Fig. 3 is a top plan view of the construction shown in Fig. 2.
Figure 4:
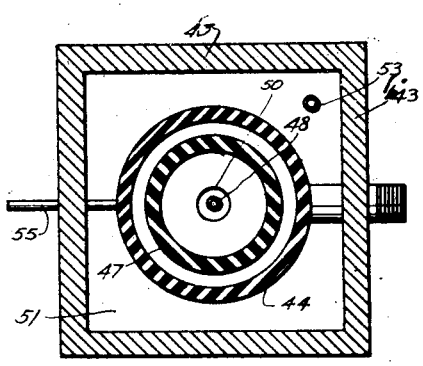
Fig. 4 is a transverse, sectional view taken on line 4—4 of Figure 2.

In Figure 2 I have shown a modified form of construction wherein the liquid to be treated is introduced at the bottom of the treating chamber. In this instance an outer casing 43 is provided which is preferably angular in cross section as shown, and is provided with an inner tubular lining 44 extending the entire height thereof. This inner lining carries an electrode 45 which is of the same diameter as the lining 44, and which forms the lower portion of said lining.

Rising from the bottom of the casing 43, preferably having a screw threaded connection therewith as shown in Figure 2, is a funnel shaped member 46, which may be insulated from the frame with hard rubber, making electrical connection with the inner electrode 47 and the water intake.

Supported upon this funnel shaped member 46 is a tubular electrode 47 which is smaller in diameter than the electrode 45, and is positioned inside of the electrode 45 and out of contact therewith to form a narrow passageway between the electrodes 45 and 47.

48 is a chamber within the tubular electrode 47 which is closed at the top by a suitable cover 49, having guide members projecting therefrom to maintain it in proper position relative to the outer electrode 45. Extending upwardly from this cover 49 is a tube or handle 50 by means of which the inner electrode may be removed from its position when desired.

A chamber 51 is provided between the outer casing 43 and the lining 44. Water is introduced through the pipe 52 into the chambers 51 and 48 for the purpose of cooling the electrodes 45—47. An overflow pipe 53 maintains the water level at the height desired in the chamber 51 and the overflow pipe 55 maintains the desired water level in the chamber 48.

55 and 56 are electrode terminals which have proper connection with a source of electrical energy to supply the current necessary for the treatment of the liquid as herein explained.

In this construction as in the construction shown in Figure 1, I have provided a thermodynamic valve 57 by means of which the treated liquid is automatically discharged through pipe 57ª when reaching the level of said valve. I have also provided a discharge pipe 58 in the event said valve 57 for any reason is not operated at the proper time.

In this construction it will be observed the liquid to be treated is introduced into the sterilizer through the pipe 59 entering the treating chamber 60 at the bottom thereof, allowing the liquid to rise in said chamber 60, passing between the electrodes 45—47, where current is passed through it, causing the temperature thereof to be raised to the degree desired, when as heretofore explained, the liquid will be discharged.

In connection with this form of sterilizer I wish to be understood as utilizing the preheating and cooling receptacle 29 described in connection with Figure 1, also the feeding receptacle 22 discharging the liquid to be treated in this instance into pipe 59 and thence through the sterilizer as above explained.

Figure 5:
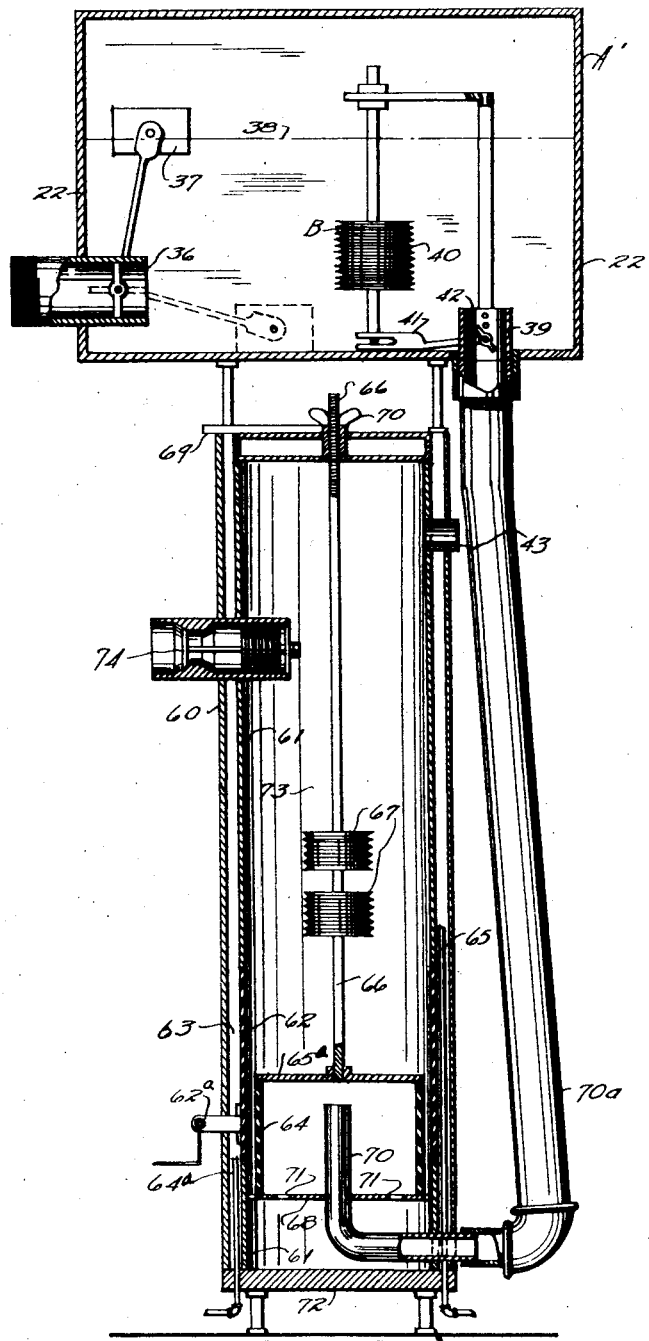
Fig. 5 is a vertical, sectional view of another modified form of sterilizing apparatus.

In Figure 5, I have shown another adaptation of my invention in which 60 is an upright casing having an inner tubular lining 61, the lower portion of which is formed of material constituting an electrode 62 of the same diameter as the lining 61. This electrode has connection with a terminal 62ª which extends to a source of electrical energy.

Between the wall of the casing 60 and the lining 61 is a chamber 63 which forms a water jacket surrounding the electrode 62, by means of which the electrode may be cooled by water supply through pipe 64ª, the desired water level being maintained by overflow pipe 65. Supported inside of the lining 61 is a vertically movable drum, the body, 64, of which is formed of material constituting an electrode. The top of this drum is closed by the plate 65ª to which is connected a rod, 66, which extends upwardly through the top of the casing 60. A thermostat 67 is supported upon the rod 66, the expansive members of which under expansion and contraction cause the drum, 64, to move vertically to expose a greater or lesser electrode surface on the drum to the electrode surface 62 surrounding it.

The lower end of the drum is enclosed by a perforated plate 68 which extends to the wall of the lining 61, the inner electrode 64 has proper connection through the rod 66 and terminal 69, connected therewith to a source of electrical energy, the capacity adjustment thereof being controlled by the adjustment of the nut, 70, upon the screw threaded end of the rod 66. This capacity adjustment is effected by variation in position of the electrode 64 relative to the bottom of the electrode 62 whereby more or less of the electrode 64 is positioned in opposed spaced relation with the electrode 62.

The liquid to be treated passes to the sterilizer in this construction through the pipe 70ª which overflows inside the drum and passes downwardly through the perforations 71, into the chamber 72, gradually filling said chamber. The liquid passing between the electrodes 62 and 64 to the upper chamber 73 is discharged through pipe, 74, and is carried to the cooling receptacle heretofore described and from thence to a bottling or sealing mechanism.

Referring to each of the different forms of construction shown herein, and the electrical connections with the apparatus, I wish to be understood in each instance as employing connections suitably made for utilizing an alternating current in the treatment of liquid in this apparatus.

In the different forms of construction here shown it will be noted that my apparatus is so arranged that it is entirely automatic in its operation, having automatic intake and discharge apparatus, automatic adjustment of the inner electrode to increase or decrease the active area of the electrode surface, to control the amount of current being used, also to control the amount of liquid permitted to flow into the sterilizer. By the use of the insulating member 89, shown in Fig. 6, which may be automatically adjusted between the electrode surfaces regulated by thermostatic control, the amount of active surface area of the electrodes whereby a portion of the electrode surface may be rendered inactive and at the same time introducing more liquid into the apparatus.

This insures a double control of the exposed electrode surfaces, also insures more accurate regulation of the apparatus by controlling both the current supply and the supply of liquid to the sterilizer.

In the constructions here shown I wish to point out particularly and claim as my invention the arrangement of the electrodes concentrically as shown in the drawings herein as I consider this one of the important features of my invention.

By this arrangement the liquid passes in a comparatively thin sheet between the electrodes and thus requires less current pressure to secure the required temperature while maintaining a comparatively large volume of flow due to the concentric arrangement of the electrodes.

Figure 6:
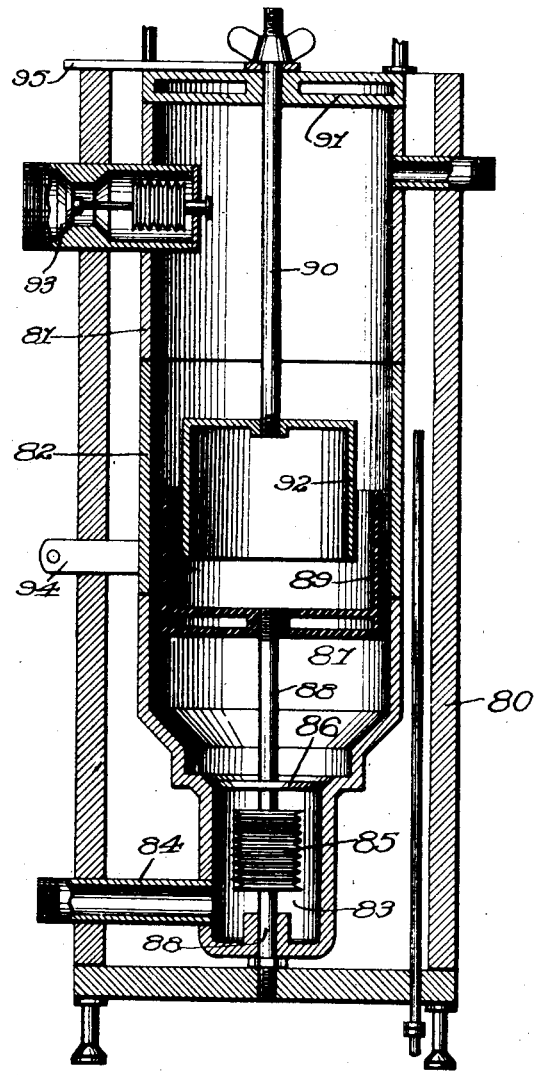
Fig. 6 is also a vertical, sectional view of a modified form of construction.

In the construction shown in Figure 6, I have illustrated a modified form of sterilizer in which provision is made to regulate the active surface of the electrode. In this instance I employ a vertical upright casing 80, having an inner cylindrical casing 81, which carries in the wall thereof an electrode 82. In this instance the lower part of the casing 81 is smaller in diameter, having in the bottom thereof a chamber 83 into which the liquid being treated is introduced through pipe 84. The temperature of the liquid will cause the expansion of the thermostat 85, the action of which raises the valve 86 from its seat and permits the liquid to flow into the treating chamber 87.

88 is a vertical extending rod supported in the bottom of the casing 80 and upon which is mounted a thermostat, 85. This rod also supports the valve 86 and at the upper end thereof is mounted the insulating member 89 which is cylindrical in form and of smaller diameter than the electrode 82.

A rod 90 is supported upon a suitable frame 91, positioned in the upper part of the casing 82. Carried upon this rod and held in suspended position is an inner electrode 92, which is preferably cylindrical in shape and of smaller diameter than the outer electrode 82 and also of smaller diameter than the insulating member 89.

As will be seen in Figure 6, this insulating member 89 is adapted to be vertically movable between the electrode surfaces 82—92. This insulating member being vertically movable between these electrodes through the action of the thermodynamic valve 86, heretofore described will regulate the amount of electrode surface active during the process of sterilization.

The initial position of the insulating member 89 will be determined by the temperature required in the treatment, and may be in a higher or lower relative position than that shown in the drawings.

As the liquid being treated passes upwardly between the electrode surfaces it is heated to the required temperature when it will automatically operate the thermodynamic valve 93 and be discharged from the sterilizer. In the construction shown in Fig. 6, 94 and 95 are the terminals through which suitable connection is made with a source of electrical energy, and the alternating current is used as in the other embodiments of construction heretofore described.

I claim:—

1. An apparatus for sterilizing liquids comprising a receptacle, concentrically arranged electrodes in said receptacle and having terminals adapted for connection with a source of electrical energy, the outer electrode and the receptacle being spaced apart to form a water jacket therebetween, inlet and outlet pipes communicating with said water jacket whereby said electrode is cooled while current is passing therethrough.

2. An apparatus for sterilizing liquids comprising a receptacle, concentrically arranged electrodes in said receptacle, and having terminals adapted for connection with a source of electrical energy, said electrodes arranged to form cooling chambers in communication with one wall thereof whereby said electrodes may be cooled while the liquid is being sterilized.

3. An apparatus for sterilizing liquids comprising a receptacle, electrodes in said receptacle, having terminals adapted for connection with a source of electrical energy, means for cooling said electrodes while the liquid is being sterilized, and means for increasing or decreasing the active area of the electrode surface.

4. An apparatus for electrically sterilizing liquids comprising an outer casing, electrodes in said casing positioned concentrically to form a passageway therebetween for the transit of the liquid being treated, means for cooling said electrodes, and temperature responsive mechanism controlling the intake and discharge of the liquid.

5. An apparatus for sterilizing liquids comprising a receptacle, electrodes arranged within said receptacle, said electrodes being positioned to form a narrow passageway therebetween for the transit of the liquid being treated, said electrodes being positioned out of contact with the walls of the receptacle whereby a cooling chamber is provided within said receptacle and surrounding the electrodes, and automatically operated valves controlling the passage of the liquid being treated.

6. An apparatus for sterilizing liquids comprising a receptacle, an inner casing, an electrode in said casing, a receptacle within said casing carrying an electrode positioned to form a narrow passageway between it and the first mentioned electrode, and temperature responsive mechanism controlling the passage of the liquid being treated.

7. An apparatus for sterilizing liquids comprising a receptacle, an inner casing positioned to form a cooling chamber between it and the wall of the receptacle, an electrode in said casing, a receptacle within said casing carrying an electrode positioned to form a narrow passageway between it and the first mentioned electrode, and temperature responsive mechanism controlling the passage of the liquid being treated.

8. An apparatus for sterilizing liquids comprising an upright receptacle, an inner casing arranged therein and forming a chamber between its outer wall and the receptacle, an electrode forming a part of said casing, a liquid receiving receptacle positioned within said inner casing, the walls of which receptacle constitute an electrode and form a passageway for the transit of the liquid being treated, and temperature responsive mechanism controlling the discharge of the liquid being treated.

9. An apparatus for sterilizing liquids comprising a receptacle, electrodes supported independently of each other in said receptacle and so arranged that a passageway is provided between said electrodes for the transit of the liquid being treated, and temperature responsive means for varying the electrode surfaces exposed to the action of electric currents.

10. An apparatus for sterilizing liquids comprising a receptacle, electrodes supported independently of each other in spaced relation in said receptacle and out of contact with said receptacle, the space between the electrodes providing the sole passageway for liquid, means for causing flow of liquid through the said passageway, and means for varying the electrode surface exposed to electrical current without variation in the volume of liquid treated.

11. An apparatus for sterilizing liquids comprising a receptacle, electrodes supported independently of each other in said receptacle and out of contact with the receptacle, each of said electrodes having a cooling chamber on one side thereof, means for varying the electrode surface exposed to electrical current and regulating the volume of liquid treated, and valve mechanism automatically operated to discharge the sterilized liquid at a predetermined temperature.

12. An apparatus for sterilizing liquids comprising a receptacle, electrodes supported independently of each other within said receptacle, said electrodes being out of contact with each other and providing a passageway therebetween for the liquid being treated, temperature responsive mechanism controlling the admission of liquid to be treated, and temperature responsive mechanism controlling the discharge of the treated liquid.

13. In an apparatus for electrically treating liquids, a casing, concentrically arranged electrodes within said casing, means for cooling said electrodes, and automatically operated mechanism controlling the discharge of the treated liquid at a predetermined temperature.

14. In an apparatus for electrically treating liquids, an outer casing, an inner casing forming a cooling chamber therebetween, concentrically arranged electrodes, temperature responsive mechanism controlling the active electrode surface during the treating operation, and temperature responsive mechanism controlling the discharge of the treated liquid.

15. In an apparatus for electrically treating liquids, a receptacle comprising an outer and an inner casing having a water cooling chamber therebetween with inlet and outlet pipes in communication therewith, concentric electrodes providing a passageway for the liquid being treated, temperature responsive mechanism regulating the supply and discharge of the liquid being treated, and temperature responsive mechanism regulating the active surface of the electrodes while the liquid is being treated.

16. In an apparatus for sterilizing liquids, the combination of electrodes arranged concentrically with relation to each other and having an outer and inner cooling chamber in communication therewith, means for introducing liquid to be treated at the bottom of the sterilizing chamber and causing it to flow upwardly between said electrodes, and temperature responsive mechanism above the electrodes for discharging said liquid at a predetermined temperature.

17. In an apparatus for sterilizing liquids, the combination of electrodes arranged concentrically with relation to each other and having outer and inner cooling chambers in communication therewith, said electrodes having communication with a source of electrical energy, means for introducing the liquid to be treated at the bottom of the sterilizing chamber and causing it to travel upwardly between the electrodes, and means for automatically discharging said liquid at a higher level.

18. In an apparatus for sterilizing liquids, the combination of two upright receptacles, positioned one within the other and forming a cooling chamber therebetween, part of said inner receptacle formed of material constituting an electrode, a drum constituting an electrode suspended within the first mentioned electrode and providing a narrow passageway between said electrodes, and temperature responsive mechanism regulating the exposed surfaces of said drum to the first named electrode.

19. In an apparatus for sterilizing liquids, the combination of upright receptacles positioned one within the other and forming a cooling chamber therebetween, inlet and outlet pipes having communication with said chamber, a portion of said inner receptacle constituting an electrode, a vertical, movable drum suspended within said inner receptacle, temperature responsive mechanism arranged in operative relation therewith to regulate the electrode surface of said drum to be exposed to the first named electrode, means for introducing the liquid to be sterilized within said drum and causing it to flow downwardly and upwardly through a narrow channel between the aforesaid electrodes and be discharged at a higher level 20. An apparatus for sterilizing liquids comprising an upright receptacle, vertically arranged electrodes in said receptacle, each electrode having a cooling chamber upon one side thereof, said electrodes being disposed concentrically with respect to each other providing a restricted passageway for the liquid being treated, and means for maintaining a predetermined voltage pressure per square inch on the liquid in transit through said channel.

21. An apparatus for sterilizing liquids, comprising an upright receptacle, vertically arranged electrodes in said receptacle, disposed concentrically with respect to each other and each electrode having a cooling chamber upon one side thereof, means for causing the liquid being treated to move in an upward direction between said electrodes, and means for maintaining a predetermined voltage pressure per square inch upon the liquid in transit between the electrodes.

22. An apparatus for sterilizing liquids, comprising an upright receptacle, electrodes in said receptacle arranged concentrically with respect to each other and forming a channel therebetween for the transit of the liquid being treated, means for causing the liquid to move upwardly between said electrodes, and temperature responsive mechanism regulating the discharge of the treated liquid.

23. An apparatus for sterilizing liquids comprising an upright receptacle, electrodes in said receptacle arranged concentrically with respect to each other forming a channel through which the liquid being treated is passed in an upward direction, means for regulating the voltage pressure per square inch on the liquid passing through said channel, and temperature responsive mechinism regulating the discharge of the treated liquid.

24. An apparatus for sterilizing liquids comprising an upright receptacle, electrodes in said receptacle arranged concentrically with respect to each other and temperature control means supporting one of the electrodes and arranged to produce an elevation thereof so as to change the relative position between said electrodes.

In testimony whereof I have signed this specification.

HARRY B. RUDD.